(12) United States Patent
Iwasawa et al.

(10) Patent No.: US 9,733,358 B2
(45) Date of Patent: Aug. 15, 2017

(54) LASER SCANNING SENSOR

(71) Applicant: OPTEX Co., Ltd., Shiga (JP)

(72) Inventors: Masashi Iwasawa, Shiga (JP); Seongho Cho, Shiga (JP)

(73) Assignee: OPTEX CO., LTD., Shiga (JP)

( * ) Notice: Subject to any disclaimer, the term of this patent is extended or adjusted under 35 U.S.C. 154(b) by 230 days.

(21) Appl. No.: 14/429,150

(22) PCT Filed: Aug. 28, 2013

(86) PCT No.: PCT/JP2013/072978
§ 371 (c)(1),
(2) Date: Mar. 18, 2015

(87) PCT Pub. No.: WO2014/045817
PCT Pub. Date: Mar. 27, 2014

(65) Prior Publication Data
US 2015/0212209 A1   Jul. 30, 2015

(30) Foreign Application Priority Data
Sep. 19, 2012   (JP) .................................. 2012-205919

(51) Int. Cl.
*G01C 3/08* (2006.01)
*G01S 17/50* (2006.01)
(Continued)

(52) U.S. Cl.
CPC ............ *G01S 17/50* (2013.01); *G01S 7/4802* (2013.01); *G01S 7/4808* (2013.01);
(Continued)

(58) Field of Classification Search
CPC ....... G08B 13/187; G01S 17/42; G01S 17/50; G01S 17/026; G01S 7/4817; G01S 7/4808; G01S 7/4802
(Continued)

(56) References Cited

U.S. PATENT DOCUMENTS

| 6,480,270 B1 | 11/2002 | Studnicka et al. |
| 7,515,256 B2 * | 4/2009 | Ohtomo ............... G01C 15/002 356/141.1 |

(Continued)

FOREIGN PATENT DOCUMENTS

| EP | 2 048 517 | 4/2009 |
| EP | 2 053 427 | 4/2009 |

(Continued)

OTHER PUBLICATIONS

Extended European Search Report issued May 31, 2016 in corresponding European patent application No. 13838772.5.
(Continued)

*Primary Examiner* — Mark Hellner
(74) *Attorney, Agent, or Firm* — Wenderoth, Lind & Ponack, L.L.P.

(57) ABSTRACT

The laser scanning sensor includes a laser distance meter, a scanning mechanism, a distance data acquisition unit, a distance data complementation unit, a human body judgment unit, an alarm output control unit, and a memory. For each measurement direction when a piece of distance information corresponds to an unintended object located at a shorter distance than an object to be originally detected and when complementation of the piece of distance information is possible based on a piece of distance information in an adjacent measurement direction or at a previous measurement cycle, the distance data complementation unit replaces the piece of distance information in the measurement direction corresponding to the unintended object with an interpolated value based on the piece of distance information acquired in the adjacent measurement direction or with an interpolated value based on the piece of distance information acquired in the measurement direction at a previous measurement cycle.

8 Claims, 5 Drawing Sheets

(51) Int. Cl.
    *G01S 17/42*     (2006.01)
    *G01S 7/481*     (2006.01)
    *G08B 13/187*    (2006.01)
    *G01S 7/48*      (2006.01)
    *G01S 17/02*     (2006.01)

(52) U.S. Cl.
    CPC .......... *G01S 7/4817* (2013.01); *G01S 17/026* (2013.01); *G01S 17/42* (2013.01); *G08B 13/187* (2013.01)

(58) Field of Classification Search
    USPC ........................................................ 356/5.01
    See application file for complete search history.

(56) References Cited

U.S. PATENT DOCUMENTS 7,760,336 B2 *   7/2010   Iwasawa .............. G01S 7/4802
                                                        356/4.01

2002/0131033 A1   9/2002   Takada et al.
    2009/0091447 A1   4/2009   Iwasawa
    2009/0109421 A1   4/2009   Iwasawa

FOREIGN PATENT DOCUMENTS

JP    3011121       2/2000
    JP    2000-298172   10/2000
    JP    2003-304613   10/2003
    JP    2004-185363   7/2004
    JP    2009-093428   4/2009
    JP    2009-110069   5/2009

OTHER PUBLICATIONS

International Search Report issued Dec. 10, 2013 in International (PCT) Application No. PCT/JP2013/072978 with English translation.

* cited by examiner

LASER SCANNING SENSOR

TECHNICAL FIELD

The present invention relates to a laser scanning sensor which detects an intruder or the like into building premises, and particularly relates to a laser scanning sensor which can maintain its reliability in detection of an intruder or the like even in bad weather such as thick fog, heavy rain, and heavy snow.

BACKGROUND ART

Among the conventionally known security devices, there is a microwave sensor which emits microwaves to a detection area. If an intruder is present in the detection area, this microwave sensor catches a microwave reflected by the intruder and thereby detects the presence of the intruder.

There has been also known a "security system" that detects an intruder by employing a laser distance meter whose light source is a laser beam, instead of microwaves (see, for example, Patent Literature 1).

This "security system" is equipped with a sensor unit, a swivel camera unit, and a control unit. The sensor unit sets a monitoring area according to a scan angle for effecting two-dimensional scanning by a beam from the light distance meter. When an intruder is detected in the monitoring area, the sensor unit outputs distance data and angle data with regard to the intruder. The swivel camera unit is mounted on an electric swivel base, and swivels in conjunction with the sensor unit. When the sensor unit detects more than one continuous change in the distance data or the angle data, the control unit checks the presence or absence of an intruder, calculates a position of the intruder based on the changed distance data and the changed angle data sent from the sensor unit, causes the swivel camera unit on the electric swivel base to swivel in accordance with the positional data, and causes a monitor to display image data of the intruder.

Although slightly different from the security device and the security system, there has also been suggested an "object identification process by an area sensor" which can correctly identify a pedestrian or the like with use of a laser beam (see, for example, Patent Literature 2).

According to this "object identification process by an area sensor", a detection range covers a walking area for guiding pedestrians and a perimeter area around the walking area. An area sensor projects a pulse laser beam by a laser sensor to scan the detection range, and measures a reflection time of the beam. For each scanning point, the area sensor obtains a difference between a reflection time in the presence of an object and a reflection time in the absence of an object, and thereby calculates the shape and size of the object, and a vector related to the change in the object position for each scanning cycle. Based on the arithmetic signal, the area sensor distinguishes between an object moving along the walking area and an object moving across the walking area.

Further, the inventors of the present application have already proposed a laser area sensor which can accurately detect an intruder or the like and which can minimize false detection, irrespective of an installation site, weather conditions, or other factors, by maximally excluding negative effects on the laser beam in outdoor installation in bad weather or the like (see Patent Literature 3).

This laser area sensor is characterized in having a first laser distance meter, a scanning mechanism unit, an information acquisition unit, a first information correction unit, a human body judgment unit, and a human body detection signal output unit. The first laser distance meter emits a pulse laser beam, measures the time from the emission until a beam is reflected by at least one object in the direction of the beam, and thereby obtains distance information to the object and received light level information of the reflected light. The scanning mechanism unit changes the measurement direction by the first laser distance meter. By allowing the scanning mechanism unit to change the measurement direction and allowing the first laser distance meter to make a periodic measurement, the information acquisition unit defines a detection area and sequentially acquires distance information and received light level information for each measurement direction. In the first information correction unit, the distance information and the received light level information acquired by the information acquisition unit at a measurement cycle are compared, in each measurement direction, with the distance information and the received light level information acquired before and after this measurement cycle. If the comparison reveals a discontinuous change that exceeds a predetermined degree, the first information correction unit cancels the distance information that corresponds to the discontinuous change in this measurement cycle in the relevant measurement direction, and corrects a portion of received light level information that does not correspond to the discontinuous change. The human body judgment unit extracts a portion of distance information that has been corrected by the first information correction unit and that is assumed to be a human body. Based on the sequential movement status of the extracted portion of information, the human body judgment unit judges whether the extracted portion of information corresponds to a human body. If the human body judgment unit confirms the presence of a human body, the human body detection signal output unit outputs a human body detection signal.

PRIOR ART DOCUMENTS

Patent Literature

[Patent Literature 1] JP 3011121 B2
[Patent Literature 2] JP 2004-185363 A
[Patent Literature 3] JP 2009-110069 A

DISCLOSURE OF THE INVENTION

Problems to be Solved by the Invention

In normal rain, snow, fog, or like conditions, the laser area sensor as disclosed in Patent Literature 3 above is sufficiently capable of recognizing the shape of a human body. However, in thick fog, heavy rain, heavy snow, etc., a laser beam in some measurement direction may completely reflects off a small droplet in the air. As a result, the distance information that corresponds to the human body shape may be partially unavailable. Such a lack of the distance information cannot be necessarily compensated by a simple noise-canceling process by a filter or the like, and may hamper recognition of the human body shape.

An object of the present invention is to provide a laser scanning sensor which can maximally eliminate or restore a negative effect on a laser beam in outdoor installation in bad weather or the like and which can improve the accuracy in detecting an intruder or the like in thick fog, heavy rain, heavy snow, etc., in comparison with the conventional techniques.

Means for Solving the Problems

A laser scanning sensor according to the present invention is characterized by including a laser distance meter, a scanning mechanism unit, a distance information acquisition unit, a distance information interpolation unit, a judgment unit, and an alarm signal output unit. The laser distance meter emits a laser beam, and measures a distance to at least one object present in a direction of the laser beam, based on a time until the laser beam reflects off the at least one object and returns to the laser distance meter. The scanning mechanism unit changes a measurement direction by the laser distance meter. The distance information acquisition unit defines a detection area and sequentially acquires distance information containing at least one distance measured in each measurement direction in the detection area, by allowing the scanning mechanism unit to change the measurement direction and allowing the laser distance meter to make a periodic measurement. The distance information interpolation unit carries out an interpolation process for each measurement direction. The interpolation process is effected when a piece of the distance information acquired by the distance information acquisition unit is judged to correspond to an unintended object that exists at a shorter distance than an object to be originally detected, and when complementation of a piece of the distance information corresponding to the unintended object is judged to be possible based on a piece of the distance information acquired in an adjacent measurement direction or a piece of the distance information acquired at a previous measurement cycle. The interpolation process includes replacing the piece of the distance information in the measurement direction corresponding to the unintended object with an interpolated value based on the piece of the distance information acquired in the adjacent measurement direction at a same measurement cycle or with an interpolated value based on the piece of the distance information acquired in the measurement direction at the previous measurement cycle. The judgment unit extracts a portion of the distance information that may correspond to an object or a human body, wherein the distance information has been acquired by the distance information acquisition unit and has been subjected to the interpolation process by the distance information interpolation unit as required. Then, the judgment unit judges whether the extracted portion of the distance information corresponds to an object or a human body, based on a sequential movement status regarding the extracted portion of the distance information. The alarm signal output unit outputs an alarm signal if the judgment unit confirms presence of an object or a human body.

This laser scanning sensor may also include a detection area information storage unit which stores, as detection area information, a maximum detectable distance, or a distance corresponding to an outer periphery of the detection area in each measurement direction. Further, the distance information interpolation unit may make a judgment that a piece of the distance information corresponds to the unintended object that exists at a shorter distance than the object to be originally detected, if a distance difference between the detection area information and a maximum distance contained in the distance information acquired in each measurement direction by the distance information acquisition unit is equal to or greater than a predetermined value.

The distance information interpolation unit may make a judgment that the complementation is possible, with a proviso: that, in one or more measurement directions other than the measurement direction, a distance difference between the detection area information and a maximum distance contained in the distance information acquired at the same measurement cycle in each of the one or more other measurement directions is equal to or greater than the predetermined value; that the distance difference equal to or greater than the predetermined value is within a predetermined distance difference range; and that a total spacing of the one or more measurement directions whose distance information has been judged to correspond to the unintended object at a shorter distance than the object to be originally detected is narrower than the object to be originally detected.

The laser scanning sensor having the above configurations accurately judges one or more measurement directions in which the distance information corresponding to a human body shape is partly unavailable because a laser beam has been completely reflected by a small droplet in the air due to thick fog, heavy rain, heavy snow, etc. Then, for each of the one or more measurement direction corresponding to the unintended object, the laser scanning sensor substitutes a complementary value based on pieces of the distance information acquired in the adjacent measurement directions on both sides or with a complementary value based on a piece of the distance information acquired at a previous measurement cycle in the measurement direction corresponding to the unintended object. In this manner, the laser scanning sensor can maximally eliminate or restore a negative effect on a laser beam in outdoor installation in bad weather or the like, and can improve the accuracy in detecting an intruder or the like in thick fog, heavy rain, heavy snow, etc., in comparison with the conventional techniques.

Effects of the Invention

The laser scanning sensor according to the present invention can maximally eliminate or restore a negative effect on a laser beam in outdoor installation in bad weather or the like, and can improve the accuracy in detecting an intruder or the like in thick fog, heavy rain, heavy snow, etc., in comparison with the conventional techniques.

BRIEF DESCRIPTION OF THE DRAWINGS

FIG. 3 is a schematic diagram illustrating the measurement directions in which a complementing process of the distance data is carried out in the laser scanning sensor 100 in the event of heavy rain or the like.

MODE FOR CARRYING OUT THE INVENTION

An embodiment of the present invention is hereinafter described with reference to the drawings.

<Overall Configuration of a Laser Scanning Sensor 100>

Figure 1:
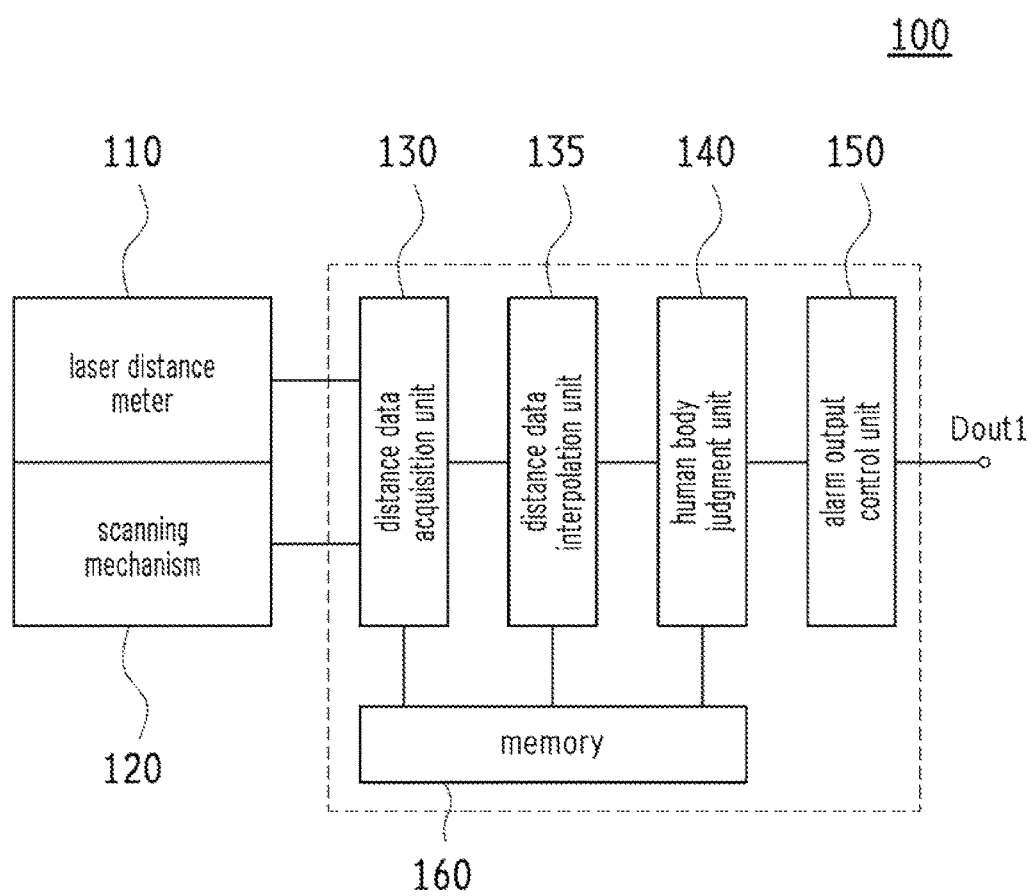
FIG. 1 is a block diagram showing a schematic configuration of a laser scanning sensor 100 according to an embodiment of the present invention.
Figure 2:
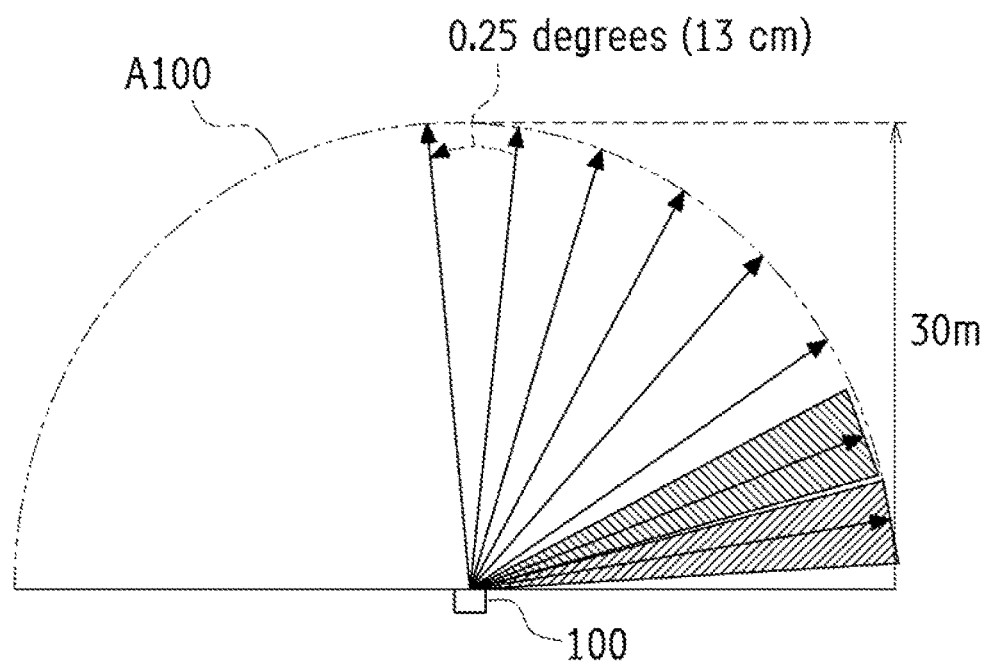
FIG. 2 is a schematic plan view showing a detection area defined by the laser scanning sensor 100.
Figure 3:
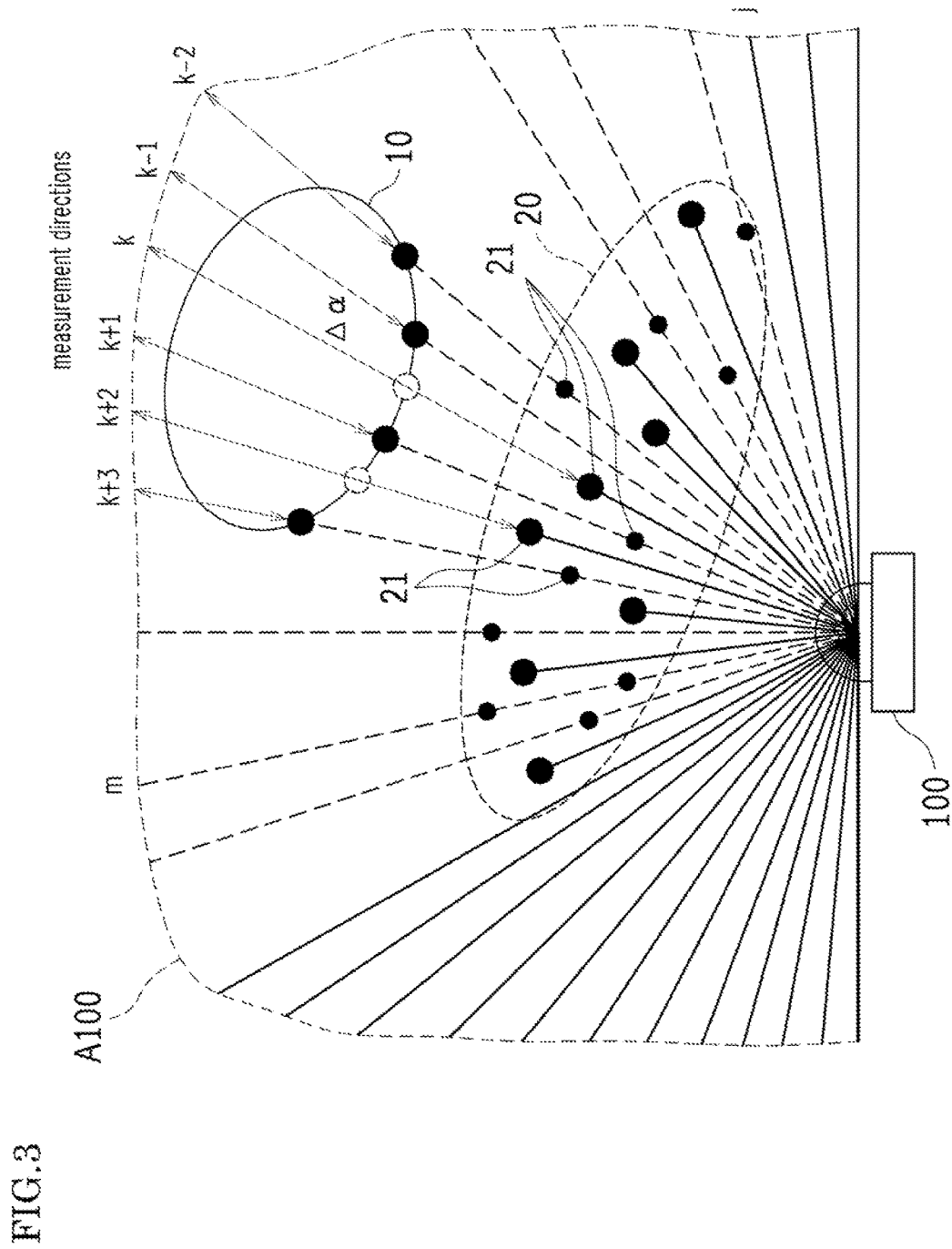

FIG. 1 is a block diagram showing a schematic configuration of a laser scanning sensor 100 according to an embodiment of the present invention. FIG. 2 is a schematic plan view showing a detection area defined by the laser scanning sensor 100. In FIG. 2, intervals between adjacent distance measurement directions are shown on a far greater scale than in reality, which is merely for the purpose of illustration. FIG. 3 is a schematic diagram illustrating the measurement directions in which a complementing process of the distance data is carried out in the laser scanning sensor 100 in the event of heavy rain or the like.

As shown in FIG. 1, the laser scanning sensor 100 includes a laser distance meter 110, a scanning mechanism 120, a distance data acquisition unit 130, a distance data complementation unit 135, a human body judgment unit 140, an alarm output control unit 150, and a memory 160.

The laser distance meter 110 obtains distance data by emitting a pulse laser beam in a certain direction and precisely measuring a fractional time until a beam reflects off at least one object in this direction and returns to the laser distance meter 110. Thereby, the laser distance meter 110 accurately measures the distance to each object and obtains distance data including a distance value for each object. Although the laser distance meter 110 may obtain three or more distance values in some measurement direction, it is supposed that the laser distance meter 110 obtains a maximum of two distance values from the short distance side (hereinafter called "first distance value d1" and "second distance value d2" from the short distance side) in this embodiment. It goes without saying that this configuration should not be taken as a limitation.

In the laser distance meter 110, a light-emitting element for the laser beam may be, for example, a semiconductor laser diode (LD). A light-receiving element may be, for example, an avalanche photodiode (APD). For drive control of the light-emitting element and for measurement of the time until the return of the reflected beam, it is desirable to provide dedicated hardware circuits or the like. Generally, the laser distance meter is characterized by its ability to make a precise measurement up to a rather long distance, for example, to a maximum of several tens of meters, or even much longer depending on the situation. In this embodiment, the maximum detection range of the laser distance meter 110 is set to 30 meters.

The scanning mechanism 120 is configured to rotate by means of a built-in motor (not shown) or the like. The scanning mechanism 120 is mechanically connected with at least a part of the laser distance meter 110 so as to change the distance measurement direction (angle) by the laser distance meter 110. For example, the laser distance meter 110 may be allowed to rotate only at an optical system thereof or to rotate as a whole, or may adopt another configuration. When the scanning mechanism 120 rotates in a predetermined direction at a constant speed, the distance measurement direction by the laser distance meter 110 changes in conjunction with this rotation.

By allowing the scanning mechanism 120 to change the measurement direction and allowing the laser distance meter 110 to make a periodic measurement, the distance data acquisition unit 130 defines a detection area A100 as shown in FIG. 2, and sequentially acquires distance data at a predetermined time interval in each measurement direction (which may be also called "step") which are set at a predetermined angular interval within the detection area A100.

In the case where a human body or the like is not present in the detection area A100 (e.g. just after the distance data acquisition unit 130 starts to operate or after the elapse of a predetermined time), distance data obtained in each measurement direction corresponds to the outer periphery (boundary) of the detection area A100. The distance data in this condition is stored in the memory 160 as reference distance data.

In this embodiment, the "distance data" is supposed to include, for example, following patterns.

(1) When only the first distance value d1 is acquired

Referring to the measurement direction j in FIG. 3, if there is no object such as a human body 10, the reflected beam returns from the outer periphery of the detection area A100, and gives only the first distance value d1 which corresponds to the outer periphery. If no or hardly any beam is reflected back, which may happen in some situation, the maximum detectable range of the laser distance meter 110 may be assigned instead.

Referring to the measurement direction k−1 in FIG. 3, the beam reflected by the human body 10 or the like gives an effective first distance value d1.

On the other hand, referring to the measurement direction k in FIG. 3, the pulse laser beam is completely reflected by a droplet 21 in the air, and gives a first distance value d1 which corresponds to the droplet 21 instead of the human body 10. This situation occurs when a droplet 21 in fog 20 or the like floats very close to the laser scanning sensor 100 and an apparent angle of the outer diameter of the droplet 21 is relatively great. The resulting first distance value d1 is assumed to be very small.

Eventually, there is a significant distance difference $\Delta d$ between this first distance value d1 and the distance to the outer periphery of the detection area A100. Hence, for example, this situation can be identified by whether the distance difference $\Delta d$ is equal to or greater than a predetermined value.

(2) When both the first distance value d1 and the second distance value d2 are acquired Referring to the measurement direction k+1 in FIG. 3, the pulse laser beam is partially reflected by a droplet 21 floating forwardly of the human body 10 (nearer the laser scanning sensor 100), and gives an effective first distance value d1 in accordance with this reflected beam. In addition, the rest of the pulse laser beam that has not been reflected by the droplet 21 and has penetrated therethrough is reflected by the human body 10 or the like, and gives an effective distance value d2 in accordance with this reflected beam. Thus, two distance values are obtained in this measurement direction.

In this situation, the second distance value d2 is assumed to be quite larger than the first distance value d1 which corresponds to the nearer droplet 21, whereas the distance difference $\Delta d$ between the second distance value d2 and the distance to the outer periphery of the detection area A100 is small. Hence, for example, this situation can be identified by whether the distance difference $\Delta d$ is smaller than a predetermined value.

Next, referring to the measurement direction m in FIG. 3, not only the first distance value d1 but also the second distance value d2 corresponds to a droplet 21 in the fog 20 or the like. In this situation, the second distance value d2 is assumed to be very small, and the distance difference $\Delta d$ between the second distance value d2 and the outer periphery the detection area A100 is small. This situation can be identified by whether the distance difference $\Delta d$ is equal to or greater than the predetermined value.

Regarding the scanning mechanism 120, the scanning cycle T may be set, for example, 50 ms (20 scans per second), and the pulse laser beams may be emitted in the range of a half rotation, i.e. 180 degrees, with a pulse width of 34 ns at an emission cycle of 34.7 µs. The thus set scanning mechanism 120 can make 720 measurements in the range of 180 degrees. In this case, the angular interval for the distance measurement is 0.25 degree, which is as little as an interval of about 13 cm even 30 meters away as shown in FIG. 2, ensuring a considerably high spatial resolution in the detection area A100. Therefore, based on the distance data acquired by the distance data acquisition unit 130, it is possible to identify the position, size (width), shape, etc. of a detected object very accurately, and to judge whether the detected object is a human body. Even if more than one human body is present in the detection area A100, each human body can be identified independently. Besides, the distance data can be acquired at each scanning cycle T, namely, at every 50 ms. It should be understood that the numerical values given herein are mere examples.

The distance data complementation unit 135 analyzes distance data and the like acquired by the distance data acquisition unit 130. If the pulse laser beam is judged to be completely reflected by a small droplet in the air or to be affected otherwise, which occurs in outdoor installation in bad weather, particularly, in thick fog, heavy rain, heavy snow, etc., the distance data complementation unit 135 carries out a complementing process in which the distance data in the affected measurement direction is replaced by a complementary value based on pieces of distance data in the adjacent measurement directions on both sides, or by a complementary value based on a piece of distance data acquired in the affected measurement direction at an earlier (for example, the most recent) measurement cycle. Details of the interpolation process will be described later with reference to FIG. 4 and FIG. 5.

The human body judgment unit 140 analyzes the distance data which has been acquired by the distance data acquisition unit 130 and has been complemented, as required, by the distance data complementation unit 135. The human body judgment unit 140 compares the distance data for each measurement direction with the corresponding reference distance data stored in the memory 160 or with the distance data in an earlier measurement cycle. This comparison reveals a possibility, in the measurement direction in which the distance data has changed, that an object may have entered the detection area or that an existing object may have been moved. By effecting two-dimensional development based on each of the distance data measurement directions, the human body judgment unit 140 extracts a portion of data that is assumed to be a human body shape from the shape and range of the object that has entered or moved.

For example, in the case where the human body 10 faces to the laser scanning sensor 100, the width of the body trunk is about several tens of centimeters, which is supposed to be 40 cm for the purpose of description. At the distance of 30 meters, the width of the body trunk corresponds to about three pieces of adjacent data. If the distance to the person gets shorter, the width across the pieces of adjacent data decreases proportionately. For example, the width across the pieces of adjacent data is about 8.8 centimeters at the distance of 20 meters, and is about 4.4 centimeters at the distance of 10 meters. At the same time, however, the number of pieces of adjacent data corresponding to the actual width of the same body trunk increases. For example, at the distance of 10 meters, the width of 40 centimeters corresponds to about nine pieces of adjacent data. Needless to say, in the case where the human body does not face to the laser scanning sensor 100 but stands obliquely or transversely, the distance data represents a narrower width.

Besides, considering the gently curved figure of the human body, the distance represented by the pieces of corresponding adjacent data should get slightly shorter toward the center of the data. Specifically, the distance data will show a downwardly-dented gentle curve with a constant width. If the distance data contains such a pattern, the object is likely to be a human body. On the other hand, if the width is too narrow, or is too wide and straight, the object is obviously not a human body.

The distance data has been sequentially acquired by the distance data acquisition unit 130. Thereafter, the human body judgment unit 140 checks how the extracted portion of distance data that has been assumed to be a human body has been changing in subsequent distance data, and grasps the state of movement on the extracted portion of distance data. If the track of movement is unusually discontinuous, it is highly unlikely that the object is a human body. In contrast, if the track of movement is completely stationary or shows a very slight distance of movement, it is at least possible to judge that the object is not an intruder to be alerted. By considering the direction of movement and other factors, it is further possible to enhance the accuracy of judgment on whether the object is an intruder to be alerted or a mere pedestrian walking near the boundary of the detection area A100. Then, taking all of these judgment results and other factors into consideration, the human body judgment unit 140 judges whether a human body to be alerted is present or not.

In this embodiment, if an object is detected at a distance of 30 meters or more, which is outside the detection area A100, the object is not subjected to the human body judgment process described above. However, this should not be construed in a limitative manner.

The alarm output control unit 150 outputs an alarm signal Dout1 when the human body judgment unit 140 confirms the presence of a human body.

The distance data acquisition unit 130, the distance data complementation unit 135, the human body judgment unit 140, the alarm output control unit 150, the memory 160, and the like (the elements enclosed by the broken line in FIG. 1) may be configured, for example, by a built-in one-chip microcomputer and its software processing. Since the above-described discrimination processes and the like can be realized by pattern matching or like method, a relatively low-cost one-chip microcomputer may be used for this purpose, thereby reducing the cost for the laser scanning sensor 100 as a whole. It should be noted, however, a one-chip microcomputer is not obligatory.

<Complementing Process for the Distance Data>

Figure 4:
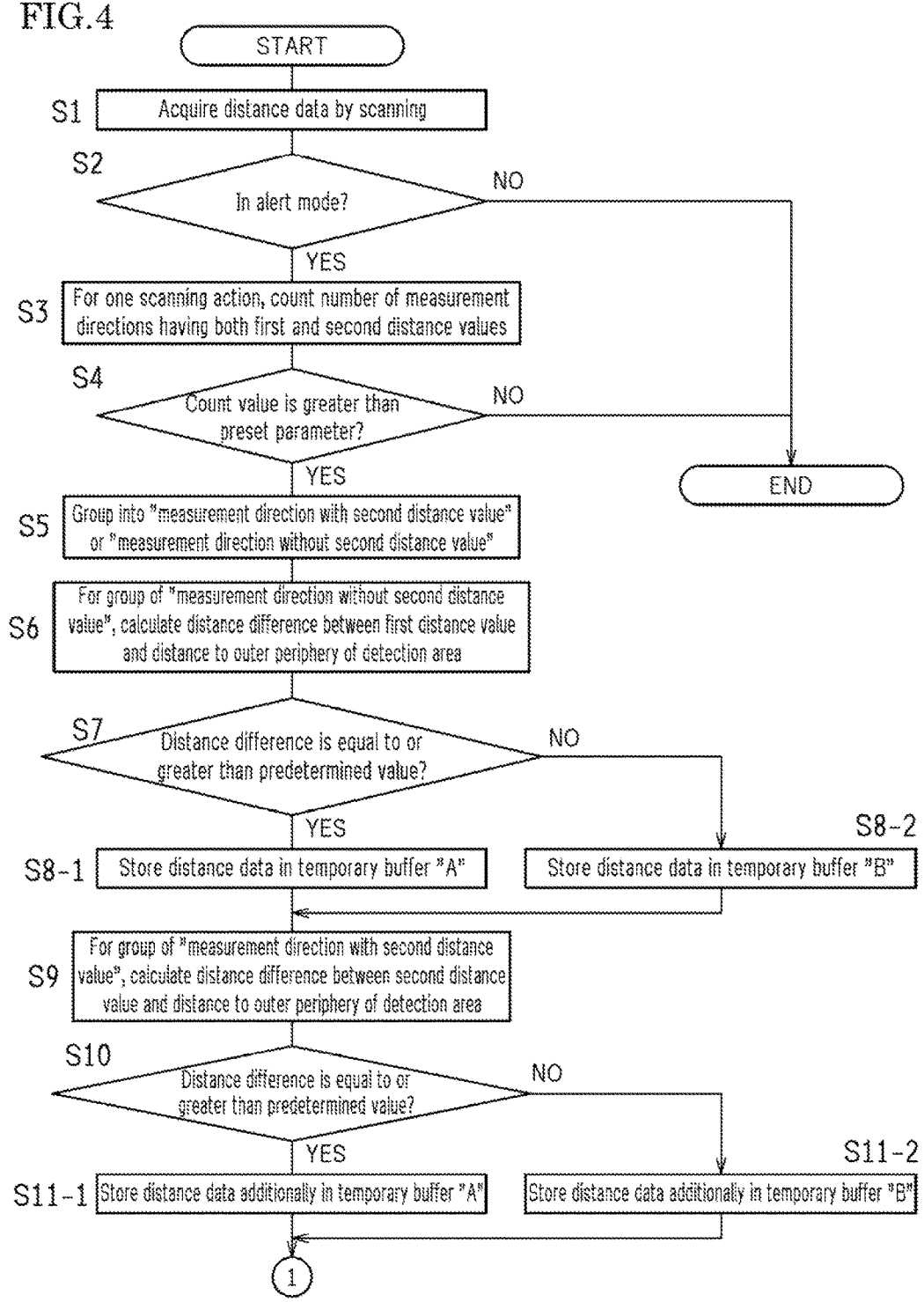
FIG. 4 is a first half of a flowchart for outlining the complementing process of the distance data in the laser scanning sensor 100.
Figure 5:
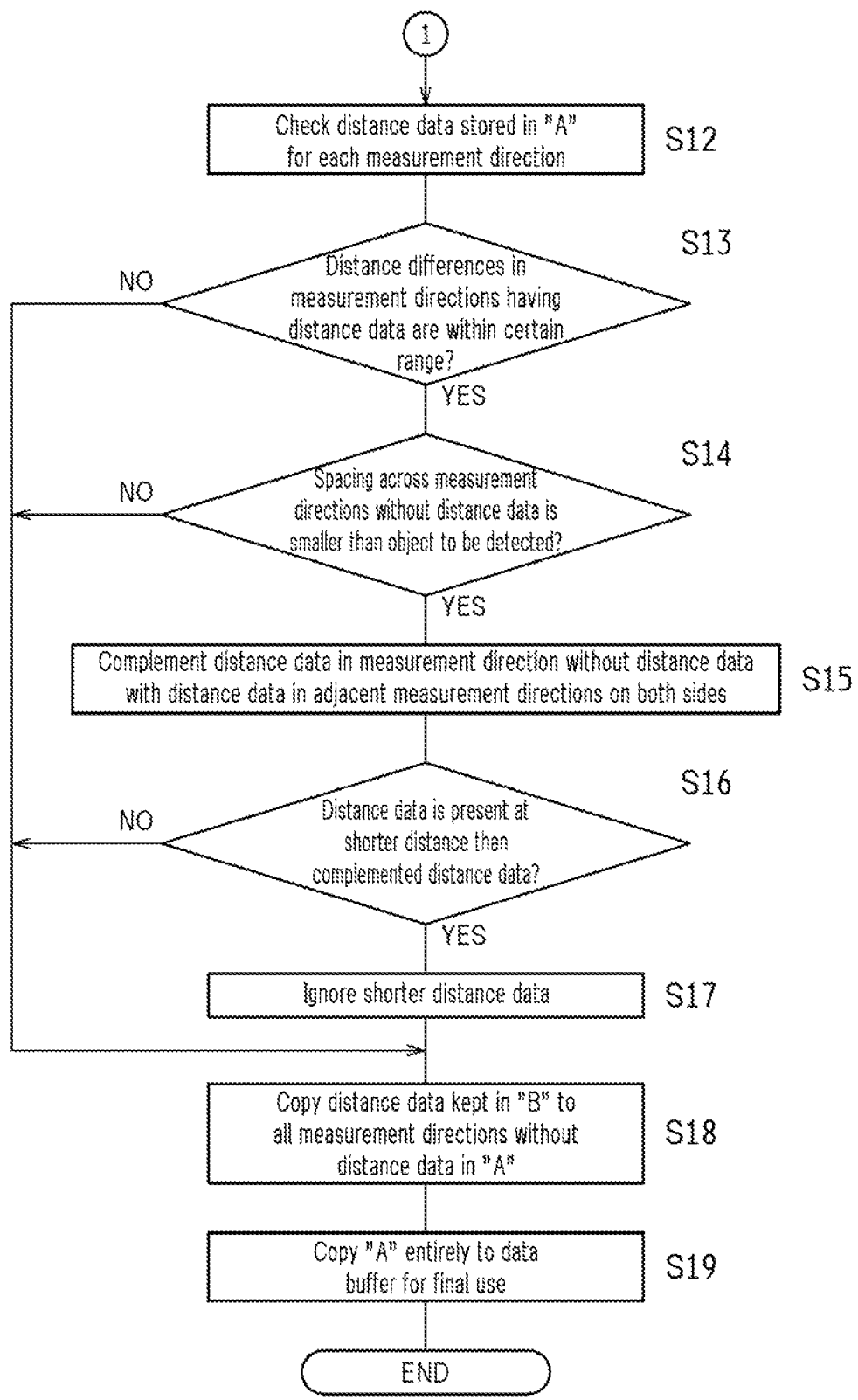
FIG. 5 is a second half of the flowchart in FIG. 4.

FIG. 4 and FIG. 5 present a flowchart for outlining the distance data complementing process in the laser scanning sensor 100.

To start with, the distance data acquisition unit 130 acquires distance data in all measurement directions at every measurement cycle (acquisition of distance data may also be called "scan") (Step S1).

The next step is to check whether the laser scanning sensor 100 is on alert or not (Step S2). If not on alert (NO in Step S2), the subsequent complementing process is unnecessary and the process is allowed to end.

If on alert (YES in Step S2), the distance data acquired in Step S1 in all measurement directions at one measurement cycle is checked, and the number of measurement directions which contain both the first distance value and the second distance value is counted (Step S3).

In Step 4, the count value is compared with a preset parameter (e.g. 50). If the count value is not over the preset parameter (NO in Step S4), the condition is not under heavy rain or thick fog and does not especially require the subsequent complementing process. Hence, the process is allowed to end.

If the count value exceeds the preset parameter (YES in Step S4), the process goes on to Step 5, where the measurement directions are grouped into either "the measurement direction in which both the first distance value and the second distance value are available (hereinafter abbreviated as "measurement direction with a second distance value")" or "the measurement direction in which only the first distance value is available and the second distance value is not available (hereinafter abbreviated as "measurement direction without a second distance value")", according to the counting in Step S3.

In Step 6, regarding the group of "measurement direction without a second distance value", calculation is made to obtain a distance difference between the first distance value and the distance to the outer periphery of the detection area A100, the latter distance having been stored in the memory 160 as reference distance data.

The judgment made in Step 7 is to determine whether the calculated distance difference is equal to or greater than a predetermined value. If the calculated distance difference is judged to be equal to or greater than the predetermined value (YES in Step S7), the distance data is stored in the temporary buffer "A" (Step S8-1). If not (NO in Step S7), the distance data is stored in the temporary buffer "B" (Step S8-2).

Next, in Step 9, regarding the group of "measurement direction with a second distance value", calculation is made to obtain a distance difference between the second distance value and the distance to the outer periphery of the detection area A100.

The judgment made in Step 10 is to determine whether the calculated distance difference is equal to or greater than a predetermined value. If the calculated distance difference is judged to be equal to or greater than the predetermined value (YES in Step S10), the distance data is stored additionally in the temporary buffer "A" (Step S11-1). If not (NO in Step S10), the distance data is stored additionally in the temporary buffer "B" (Step S11-2).

Thereafter, the distance data for each measurement direction stored in the temporary buffer "A" is checked to carry out the distance data complementing process under the prescribed conditions as explained in Steps S13-17 below.

Specifically, if the distance differences in the measurement directions which have distance data are within a certain range (YES in Step S13), and also if the spacing across the measurement directions which lack distance data is smaller than an object to be detected such as a human body (YES in Step S14), the complementing process is effected by substituting a complementary value (an interpolation value) for a piece of distance data in each measurement direction lacking distance data. This complementary value, or interpolation value, is based on pieces of distance data in the adjacent measurement directions on both sides (Step S15). Instead of the pieces of distance data in the adjacent measurement directions on both sides, a piece of distance data obtained in an earlier (for example, the most recent) measurement cycle in the very measurement direction lacking distance data may also be a complementary value (an extrapolation value).

Then, in Step S16, judgment is made as to whether any distance data is present at a shorter distance than the distance data complemented in the complementing process. Even if such distance data is present at the shorter distance (YES in Step S16), the shorter distance data is ignored (Step S17).

After this complementing process, the distance data kept in the temporary buffer "B" is copied to the temporary buffer "A", with regard to all of the measurement directions that lack distance data in the temporary buffer "A" (Step S18).

Lastly, the temporary buffer "A" is entirely copied to the data buffer for final use (Step S19), and a series of process comes to an end.

It should be understood that the present invention can be embodied and practiced in other different forms without departing from the spirit and essential characteristics of the present invention. Therefore, the above-described embodiment is considered in all respects as illustrative and not restrictive. The scope of the invention is indicated by the appended claims rather than by the foregoing description. All variations and modifications falling within the equivalency range of the appended claims are intended to be embraced therein.

The present application claims priority to Japanese Patent Application No. 2012-205919, filed Sep. 19, 2012. The contents of this application are incorporated herein by reference in their entirety. Also, the documents cited in this specification are concretely incorporated herein by reference in their entirety.

DESCRIPTION OF THE REFERENCE NUMERALS 10 human body
20 fog
21 droplet
100 laser scanning sensor
A100 detection area
110 laser distance meter
120 scanning mechanism
130 distance data acquisition unit
135 distance data complementation unit
140 human body judgment unit
150 alarm output control unit
160 memory

The invention claimed is:

1. A laser scanning sensor comprising:
a laser distance meter which emits a laser beam, and which measures a distance to at least one object present in a direction of the laser beam, based on a time until the laser beam reflects off the at least one object and returns to the laser distance meter;
a scanning mechanism unit which changes a measurement direction by the laser distance meter;
a distance information acquisition unit which defines a detection area and sequentially acquires distance information containing at least one distance measured in each measurement direction in the detection area, by allowing the scanning mechanism unit to change the measurement direction and allowing the laser distance meter to make a periodic measurement;
a distance information interpolation unit which carries out an interpolation process for each measurement direction, wherein the interpolation process is effected when a piece of said distance information acquired by the distance information acquisition unit is judged to correspond to an unintended object that exists at a shorter distance than an object to be originally detected, and when complementation of the piece of said distance information corresponding to the unintended object is judged to be possible based on a piece of said distance information acquired in an adjacent measurement direction or a piece of said distance information acquired at a previous measurement cycle, and wherein the interpolation process comprises replacing the piece of said distance information in the measurement direction corresponding to the unintended object with an interpolated value based on the piece of said distance information acquired in the adjacent measurement direction at a same measurement cycle or with an interpolated value based on the piece of said distance information acquired in the measurement direction at the previous measurement cycle;

a judgment unit which extracts a portion of said distance information that may correspond to an object or a human body, the distance information having been acquired by the distance information acquisition unit and having been subjected to the interpolation process by the distance information interpolation unit as required, and which judges whether the extracted portion of said distance information corresponds to an object or a human body, based on a sequential movement status regarding the extracted portion of said distance information; and an alarm signal output unit which outputs an alarm signal if the judgment unit confirms presence of an object or a human body.

2. The laser scanning sensor according to claim 1, further comprising a memory which stores, as detection area information, a maximum detectable distance, or a distance corresponding to an outer periphery of the detection area in each measurement direction, wherein the distance information interpolation unit makes a judgment that a piece of said distance information corresponds to the unintended object that exists at a shorter distance than the object to be originally detected, if a distance difference between the detection area information and a maximum distance contained in the distance information acquired in each measurement direction by the distance information acquisition unit is equal to or greater than a predetermined value.

3. The laser scanning sensor according to claim 2, wherein the distance information interpolation unit makes a judgment that the complementation is possible, with a proviso:

that, in one or more measurement directions other than the measurement direction, a distance difference between the detection area information and a maximum distance contained in the distance information acquired at the same measurement cycle in each of the one or more other measurement directions is equal to or greater than the predetermined value;

that the distance difference equal to or greater than the predetermined value is within a predetermined distance difference range; and that a total spacing of the one or more measurement directions whose distance information has been judged to correspond to the unintended object at a shorter distance than the object to be originally detected is narrower than the object to be originally detected.

4. The laser scanning sensor according to claim 1, wherein the interpolation process comprises replacing the piece of said distance information in the measurement direction corresponding to the unintended object with the interpolated value based on the piece of said distance information acquired in the adjacent measurement direction at the same measurement cycle.

5. A laser scanning sensor comprising:

a laser distance meter adapted to emit a laser beam, and measure a distance to at least one object present in a direction of the laser beam, based on a time until the laser beam reflects off the at least one object and returns to the laser distance meter;

a scanning mechanism unit adapted to change a measurement direction by the laser distance meter;

a distance information acquisition unit adapted to define a detection area and sequentially acquire distance information containing at least one distance measured in each of a plurality of measurement directions in the detection area as the scanning mechanism unit changes the measurement direction and the laser distance meter makes periodic measurements;

a distance information interpolation unit adapted to carry out an interpolation process for at least one of the measurement directions when a piece of the distance information acquired by the distance information acquisition unit is judged to correspond to an unintended object that exists at a shorter distance than an object to be detected, and when complementation of the piece of the distance information corresponding to the unintended object is judged to be possible based on a piece of the distance information acquired in an adjacent measurement direction at a same measurement cycle or a piece of the distance information acquired at a previous measurement cycle, wherein the interpolation process comprises replacing the piece of the distance information in the measurement direction corresponding to the unintended object with an interpolated distance value based on the piece of the distance information acquired in the adjacent measurement direction at the same measurement cycle or with an interpolated distance value based on the piece of the distance information acquired in the measurement direction at the previous measurement cycle;

a judgment unit adapted to extract a portion of the distance information that may correspond to an object or a human body, the distance information having been acquired by the distance information acquisition unit and having been subjected to the interpolation process by the distance information interpolation unit as required, and adapted to judge whether the extracted portion of the distance information corresponds to an object or a human body, based on a sequential movement status regarding the extracted portion of the distance information; and an alarm signal output unit adapted to output an alarm signal if the judgment unit confirms presence of an object or a human body.

6. The laser scanning sensor according to claim 5, further comprising a memory adapted to store, as detection area information, a maximum detectable distance, or a distance corresponding to an outer periphery of the detection area in each of the measurement directions, wherein the distance information interpolation unit is adapted to judge that a piece of the distance information corresponds to the unintended object, if a distance difference between the detection area information and a maximum distance contained in the distance information acquired in each of the measurement directions by the distance information acquisition unit is equal to or greater than a predetermined value.

7. The laser scanning sensor according to claim 6, wherein the distance information interpolation unit is adapted to judge that the complementation is possible when:

in one or more measurement directions other than the measurement direction, a distance difference between the detection area information and a maximum distance contained in the distance information acquired at the same measurement cycle in each of the one or more other measurement directions is equal to or greater than the predetermined value;

the distance difference equal to or greater than the predetermined value is within a predetermined distance difference range; and a total spacing of the one or more measurement directions whose distance information has been judged to correspond to the unintended object at a shorter distance than the object to be detected is narrower than the object to be detected.

8. The laser scanning sensor according to claim 5, wherein the interpolation process comprises replacing the piece of the distance information in the measurement direction corresponding to the unintended object with the interpolated distance value based on the piece of the distance information acquired in the adjacent measurement direction at the same measurement cycle.

\* \* \* \* \*